United States Patent
Ishimoto (10) Patent No.: US 8,886,776 B2
(45) Date of Patent: Nov. 11, 2014

(54) COMMUNICATION APPARATUS AND STORING MEDIUM

(75) Inventor: Kan Ishimoto, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 371 days.

(21) Appl. No.: 13/051,502

(22) Filed: Mar. 18, 2011

(65) Prior Publication Data

US 2011/0238800 A1   Sep. 29, 2011

(30) Foreign Application Priority Data

Mar. 29, 2010   (JP) ................................ 2010-075538

(51) Int. Cl.
*G06F 15/177* (2006.01)
*H04L 29/14* (2006.01)
*H04L 29/12* (2006.01)
*H04L 29/08* (2006.01)

(52) U.S. Cl.
CPC ............ *H04L 69/40* (2013.01); *H04L 61/1511* (2013.01); *H04L 29/12066* (2013.01); *H04L 61/103* (2013.01); *H04L 29/12226* (2013.01); *H04L 67/16* (2013.01); *H04L 61/2015* (2013.01); *H04L 29/12028* (2013.01)
USPC ....................................................... 709/221

(58) Field of Classification Search
USPC ................................................ 709/220–221
See application file for complete search history.

(56) References Cited

U.S. PATENT DOCUMENTS

| 7,020,796 B1 * | 3/2006 | Ennis et al. ..................... 714/4.1 |
| 7,568,048 B2 * | 7/2009 | Murakami .................... 709/245 |
| 2001/0056499 A1 | 12/2001 | Shirai et al. |
| 2004/0076159 A1 | 4/2004 | Utsubo |
| 2005/0068565 A1 | 3/2005 | Maeda |
| 2007/0283152 A1 * | 12/2007 | Kudo et al. .................... 713/168 |
| 2007/0286194 A1 * | 12/2007 | Shavitt et al. ................. 370/392 |

FOREIGN PATENT DOCUMENTS

| JP | H11-249989 A | 9/1999 |
| JP | 2000-269991 A | 9/2000 |
| JP | 2000-330742 A | 11/2000 |
| JP | 2002-009823 A | 1/2002 |
| JP | 2003-124935 A | 4/2003 |
| JP | 2003-198548 A | 7/2003 |
| JP | 2004-013662 A | 1/2004 |
| JP | 2004-129142 A | 4/2004 |
| JP | 2005-100270 A | 4/2005 |
| JP | 2006-018468 A | 1/2006 |
| JP | 2006-211698 A | 8/2006 |

OTHER PUBLICATIONS

Japan Patent Office, Notification of Reason for Refusal for Japanese Patent Application No. 2010-075538 (counterpart to above-captioned patent application), dated Jun. 5, 2012.

* cited by examiner

*Primary Examiner* — Vivek Srivastava
*Assistant Examiner* — Karina J Garcia-Ching
(74) *Attorney, Agent, or Firm* — Merchant & Gould PC (57) ABSTRACT

A communication apparatus obtains first identification information of a particular device, obtains a particular IP address assigned to the particular device, attempts a unicast communication with the particular device by using the particular IP address, determines whether the unicast communication fails; generates a new IP address when the unicast communication fails, and broadcasts a setting packet to a network causes the receiving device to assign the new IP address to the receiving device.

8 Claims, 6 Drawing Sheets

COMMUNICATION APPARATUS AND STORING MEDIUM

CROSS-REFERENCE TO RELATED APPLICATIONS

This application claims priority from Japanese Patent Application No. 2010-075538 filed on Mar. 29, 2010, the entire contents of which are incorporated herein by reference.

TECHNICAL FIELD

Aspects of the present description relate to a communication apparatus that is connected to another device via a network, and a storing medium.

BACKGROUND

It is disclosed in related-art a technique in which a printer driver of a printer is installed to a computer. The computer obtains a printer name of the printer, the printer's IP address, etc., when the printer driver is installed to the computer. When the printer's IP address is assigned by a Dynamic Host Configuration Protocol (DHCP) server, the printer's IP address may be updated. Thus, when a computer should execute a unicast communication with the printer, the computer executes name resolution (for example, the name resolution according to a Domain Name System (DNS) server) by using the obtained printer name, and obtains a current IP address of the printer. The computer executes unicast communication with the printer by using the current IP address of the printer.

SUMMARY

For example, it is possible that multiple DHCP servers are connected to a same LAN. In this case, a first DHCP server can assign an IP address containing a first network address to the printer, and a second DHCP server can assign an IP address containing a second network address, which is different from the first network address, to the computer. In this situation, for example, even if the computer obtains the current IP address of the printer by the name resolution, the network address of the obtained IP address is different from the network address of the computer's IP address. Thus, even if the computer executes unicast communication with the printer by using the current IP address of the printer, the communication is likely to fail. That is, according to the related-art, the unicast communication between the computer and the printer may not be executed.

Accordingly, it is an aspect of the present invention to solve the problem that the unicast communication can not be executed between the communication apparatus and another device.

According to an aspect of the present invention, there is provided a communication apparatus connected with a device via a network, the communication apparatus comprising: a first obtaining unit configured to obtain a first identification information for identifying the device, a second obtaining unit configured to obtain a current IP address set to the device, a communication unit configured to communicate with the device by using the current IP address, a generating unit configured to generate a new IP address containing a network address identical to a network address contained in an IP address currently set to the communication apparatus, and a setting unit that broadcasts a setting packet to the network when a communication with the device by using the current IP address fails, wherein the setting packet contains the first identification information and the new IP address, and when a second identification information for identifying a receiving device that receives the setting packet is identical to the first identification information contained in the setting packet, the setting packet instructs the receiving device to newly set the new IP address as an IP address of the receiving device.

According to another aspect of the present invention, there is provided a computer readable storing medium storing a computer program for causing a communication apparatus, which is connected with a device via a network and capable of obtaining a first identification information for identifying the device, obtaining a current IP address set to the device, and communicating with the device by using the current IP address, to perform a method of, generating a new IP address containing a network address identical to a network address contained in an IP address currently set to the communication apparatus, and broadcasting a setting packet to the network when a communication with the device by using the current IP address fails, wherein the setting packet contains the first identification information and the new IP address, and when a second identification information for identifying a receiving device that receives the setting packet is identical to the first identification information contained in the setting packet, the setting packet instructs the receiving device to newly set the new IP address as an IP address of the receiving device.

DETAILED DESCRIPTION

Configuration of System

Figure 1:
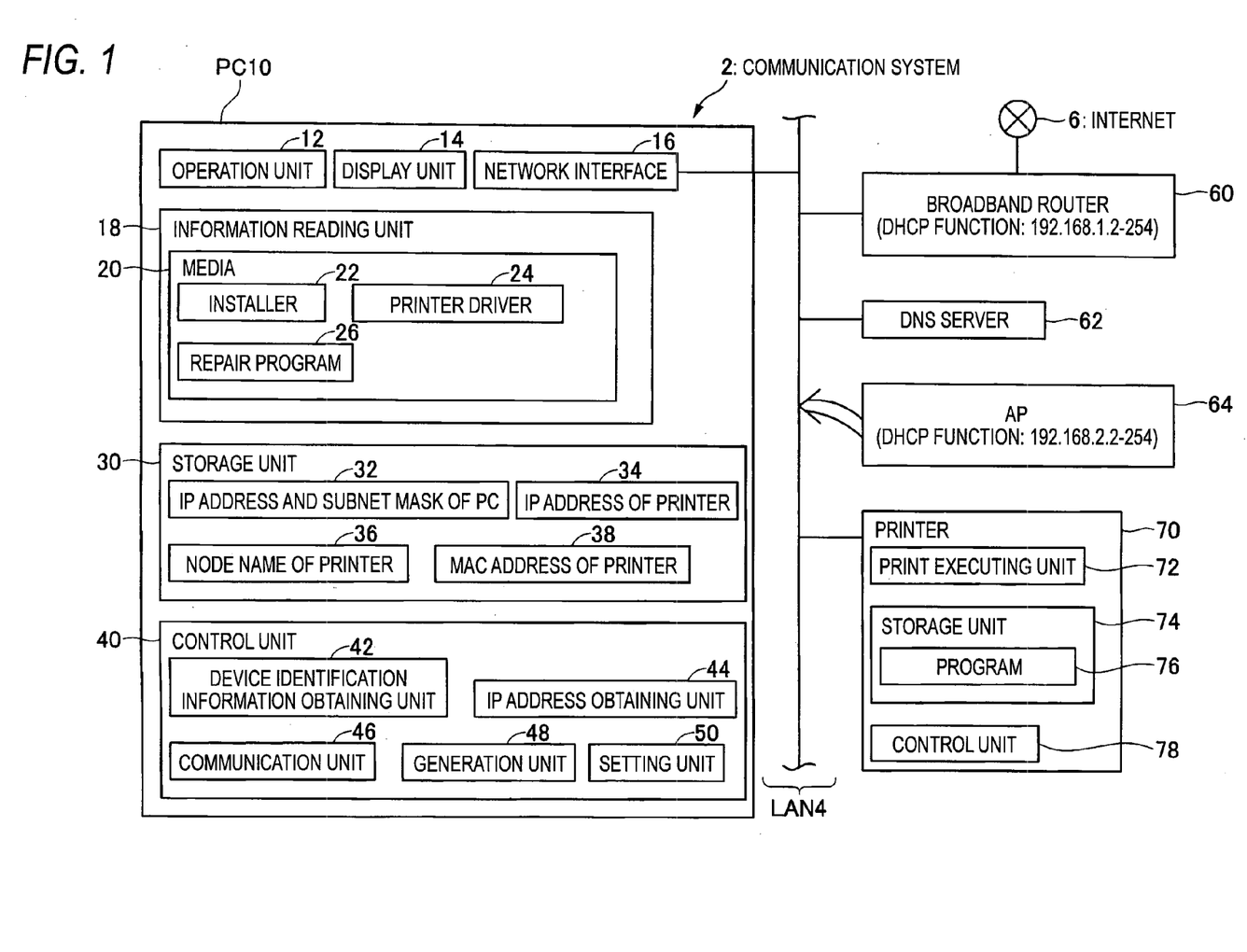
FIG. 1 shows an example of a configuration of a communication system.

An exemplary embodiment is described with reference to the drawings. As shown in FIG. 1, a communication system 2 includes a PC 10, a broadband router 60, a DNS server 62 and a printer 70. Each of the devices 10, 60, 62 and 70 is connected to a LAN 4. The devices can communicate with each other via the LAN 4. The broadband router 60 is further connected to the internet 6. In addition, a wireless access point (hereinafter called [AP] for short) 64 shown in FIG. 1 is connected to the LAN 4 after an installation process of the printer driver (see FIG. 2), which will be described later, is terminated.
(Configuration of the PC 10)

The PC 10 includes an operation unit 12, a display unit 14, a network interface 16, an information reading unit 18, a storage unit 30 and a control unit 40. The operation unit 12 includes a keyboard and a mouse. Users can input various instructions to the PC 10 by operating the operation unit 12. The display unit 14 is for displaying various information. The network interface 16 is connected to the LAN 4.

The information reading unit 18 reads data (installer 22, printer driver 24 and repair program 26) stored in a media 20. The example of the media 20 is a CD and a DVD for storing data, which is manufactured by vendors of the printer 70. The media 20 is packaged with the printer 70 when the printer 70 is shipped. The printer driver 24 of the printer 70, the repair program 26 and the installer 22 for installing the printer driver 24 and the repair program 26 are stored in the media 20.

The storage unit 30 stores an IP address and a subnet mask 32 of the PC 10, a default gateway address of the PC 10 (not shown), an IP address 34 of the printer 70, the node name 36 of the printer 70, and the MAC address 38 of the printer 70. Further, the storage unit 30 stores an Operating System (OS) program (not shown) of the PC 10. Further, the storage unit 30 stores the printer driver 24 and the repair program 26 that are read from the media 20 according to the installation process (see FIG. 2). The control unit 40 executes various processes according to the programs 24 and 26 in the storage unit 30. Functions of units 42 to 50 are realized by the control unit 40 executing processes according to the programs 24 and 26 in the storage unit 30.

(Configuration of the Printer 70)

The printer 70 includes a print executing unit 72, a storage unit 74, a control unit 78 and a network interface. The print executing unit 72 includes, for example, an inkjet head printing mechanism or a laser printing mechanism, and performs printing according to instructions from the control unit 78. The storage unit 74 stores a program 76 to be executed by the control unit 78. The program 76 contains such programs that the control unit 78 uses to execute various processes of the printing process (see FIG. 6) described later. The printer 70 may be a multi-functional machine (a peripheral machine of the PC 10) further comprising a scan function, a copy function, a FAX function and a phone function, in addition to the print function.

(Configuration of the Broadband Router 60)

The broadband router 60 is connected to the LAN 4 and the internet 6, and has a function to relay the communication between the LAN 4 and the WAN (the internet 6). Furthermore, the broadband router 60 has a function to route the communication between the device groups connected to the LAN 4. The broadband router 60 further includes a DHCP function, and assigns IP addresses to each device (the PC 10, the printer 70, etc.) connected to the LAN 4. A possible range of the IP addresses assigned by the broadband router 60 is determined in advance. In the exemplary embodiment, the broadband router 60 can assign the IP addresses in the range of [192. 168. 1. 2-254]. The IP address [192. 168. 1. 1] is used as the IP address (gateway address) of the broadband router 60 itself. The broadband router 60 sends the IP addresses that are not set in other devices connected to the LAN 4, the subnet mask used in the LAN 4 and the IP address of the broadband router 60 (that is, the gateway address described above) to the devices 10 and 70, in response to the request of the devices 10 and 70. As a result, the devices 10 and 70 set the IP addresses sent from the broadband router 60 to be their IP addresses. Furthermore, the devices 10 and 70 set the subnet mask and the gateway address sent from the broadband router 60 to be their subnet mask and the gateway address (for example, the PC 10 stores the information in the storage unit 30).

In addition, in the exemplary embodiment, the subnet mask used in the LAN 4 is [255. 255. 255. 0]. That is, the subnet mask used in the LAN 4 masks the first 24 bits. Thus, among the possible IP addresses [192. 168. 1. 2-254] assigned by the broadband router 60, the first 24 bits (the part of [192. 168. 1]) corresponds to the network address, and the last 8 bits corresponds to the host part. In addition, in the exemplary embodiment, each device 10 and 70 connected to the LAN 4 regularly (for example, every hour) require the broadband router 60 to assign IP addresses.

(Configuration of the AP 64)

As mentioned above, in the exemplary embodiment, after the installation process (see FIG. 2) has terminated, the AP 64 is connected to the LAN 4. The AP 64 has a function to relay the wireless communication between other wireless communication device groups which are not shown in FIG. 1. Similar to the broadband router 60, the AP 64 further includes a function to relay the communication between the LAN 4 and the WAN, and a function to route the communication between the device groups connected to the LAN 4. Similar to the broadband router 60, the AP 64 also includes a DHCP function, and sends the IP address, the subnet mask, and the gateway address (IP address of the AP 64) to other devices. In the exemplary embodiment, the AP 64 can assign the IP addresses in the range of [192. 168. 2. 2-254]. That is, the network address [192. 168. 2] of the IP address which can be assigned by the AP 64 is different from the network address [192. 168. 1] of the IP address which can be assigned by the broadband router 60.

(Configuration of the DNS Server 62)

The node names of the devices (for example, the PC 10 and the printer 70) and the IP addresses of the devices are correspondingly registered in the DNS server 62. For example, when the IP address is assigned from the broadband router 60 (or the AP 64), the PC 10 sends the node name of the PC 10 and the assigned IP address to the DNS server 62. As a result, the node name of the PC 10 and the IP address of the PC 10 are correspondingly registered in the DNS server 62. Similarly, when the IP address is assigned by the broadband router 60 (or the AP 64), the printer 70 registers the node name of the printer 70 and the assigned IP address in the DNS server 62. A device (for example the PC 10) connected to the LAN 4 can obtain the IP address of a target device (for example, the printer 70), to which the device should communicate with, from the DNS server 62, by sending the corresponding node name of the target device to the DNS server 62.

(Processes Executed by the PC 10)

Next, each process executed by the control unit 40 of the PC 10 will be described with reference to FIGS. 2 to 5.

(Installation Process)

First, the installation process is described with reference to FIG. 2. When users desire the printer driver 24 of the printer 70 to be installed to the PC 10, the media 20 is stored in the information reading unit 18, and predetermined operations are executed in the operation unit 12. Therefore, the control unit 40 activates the information reading unit 18 and reads data in the media 20. The control unit 40 executes the installation process of FIG. 2 according to the installer 22 in the media 20.

First, a device identification information obtaining unit 42 broadcasts a predetermined command to the LAN 4. Each device (such as the printer 70) receiving the predetermined command sends a response containing the MAC address, the node name, the IP address and the model name of the device itself, to the PC 10. As a result, the device identification information obtaining unit 42 obtains the MAC address, the node name, the IP address and the model name of each device (such as the printer 70) (S10). The model name of the printer 70 is described in the above installer 22. The device identification information obtaining unit 42 selects a model name identical to the model name of the printer 70 described in the installer 22 (that is, the model name of the printer 70) from the obtained model names of each device. Multiple model names for the printer 70 can be described in the installer 22. In this case, the device identification information obtaining unit 42 selects a model name identical to one of the multiple model names described in the installer 22 from the obtained model names of each device. As a result, when multiple printers are selected, the device identification information obtaining unit 42 displays a list showing multiple information (MAC address, model name and IP address) related to the selected multiple printers on the display unit 14, and allows the users to select a printer for which the installation of the printer driver 24 is desired. Next, the control unit 40 stores the printer driver 24 and the repair program 26 related to the printer 70 in the storage unit 30 (S12). The printer driver 24 and the repair program 26 are installed to the PC 10 thereby. Next, the device identification information obtaining unit 42 stores the MAC address, the node name, the IP address and the model name of the printer 70 obtained in S10 in the storage unit 30 (see 36 and 38 in FIG. 1) (S14). When S14 is terminated, the installation process is terminated.

(Communication Process)

Next, the communication process will be described with reference to FIG. 3. The control unit 40 executes the processes of S20 to S24 of FIG. 3 according to the printer driver 24. In addition, the control unit 40 executes the processes of S26 to S42 of FIG. 3 according to the repair program 26. Users can input printing instructions, which cause images represented by a desired file to be printed by the printer 70, to the PC 10 by operating the operation unit 12 of the PC 10. In this case, the control unit 40 determines YES in S20 and the process proceeds to S21.

In S21, an IP address obtaining unit 44 (see FIG. 1) activates a name resolution program included in the OS program. Accordingly, a module realized by the name resolution program sends a command, which contain the node name 36 of the printer 70 stored in the storage unit 30, to the DNS server 62. The DNS server 62 that receives the command sends a response, which contains the IP address of the printer 70 that are registered corresponding to the node name 36 of the printer 70, to the PC 10. As a result, the IP address obtaining unit 44 obtains the current IP address of the printer 70. The IP address obtaining unit 44 stores the obtained IP address of the printer 70 in the storage unit 30 (see 34 of FIG. 1).

Next, a communication unit 46 (see FIG. 1) tries to send the print data to the printer 70 (S22). In particular, the communication unit 46 tries to unicastly send the print data to the IP address 34 of the printer 70 obtained in S21. The communication unit 46 monitors whether the communication succeeded (S24). When the printer 70 receives the print data successfully, the printer 70 sends a response indicating that the print data is received to the PC 10. When the response is received, the communication unit 46 determines YES in S24. In this case, the communication process is terminated. On the other hand, when the printer 70 does not receive the print data successfully, the printer 70 does not send the above response to the PC 10. When the above response is not received, the communication unit 46 determines NO in S24, and the process proceeds to S26.

When the same DHCP server assigns the IP addresses for both of the PC 10 and the printer 70, generally, the communication process (unicast communication) of S22 is successful (S24 is YES). For example, before the AP 64 is connected to the LAN 4, as only one DHCP server (broadband router 60) is connected to the LAN 4, the same DHCP server assigns the IP addresses for both of the PC 10 and the printer 70. In this case, the IP addresses containing the network address of [192. 168. 1] are assigned to each of the PC 10 and the printer 70. As the PC 10 and the printer 70 have the same network address, the communication process of S22 is successful.

However, for example, when the AP 64 is connected to the LAN 4, multiple DHCP servers (broadband server 60 and AP 64) will be connected to the LAN 4. In this case, for example, it is possible that the broadband router 60 assigns an IP address (for example [192. 168. 1. 2]) to the PC 10 and the AP 64 assigns an IP address (for example [192. 168. 2. 2]) to the printer 70 (hereinafter called "the first situation"). In the first situation, in the communication process of S22, the communication unit 46 sends the print data to the IP address (for example [192. 168. 2. 2]) of the printer 70. The print data is sent to the broadband router 60 which is the gateway of the PC 10. As the network address [192. 168.1] of the broadband router 60 itself (that is, the network address of the IP address that can be assigned by the broadband router 60) is different from the network address [192. 168. 2] of the destination of the print data, the broadband router 60 may send the print data to the WAN (the internet 6). In this case, as the printer 70 does not receive the print data, the printer 70 does not send a response. As a result, as the PC 10 cannot receive the response, it is determined NO in S24.

In addition, contrary to the above example, when the AP 64 is connected to the LAN 4, it is possible that the broadband router 60 assigns an IP address (for example [192. 168. 1. 2]) to the printer 70 and the AP 64 assigns an IP address (for example [192. 168. 2. 2]) to the PC 10 (hereinafter called "the second situation"). In the second situation, in the communication process of S22, the communication unit 46 sends the print data to the IP address (for example [192. 168. 1. 2]) of the printer 70. The print data is sent to the AP 64 which is the gateway of the PC 10. As the network address [192. 168. 2] of the AP 64 itself is different from the network address [192. 168. 1] of the destination of the print data, the AP 64 may send the print data to the WAN (the internet 6). In this case, as the printer 70 does not receive the print data, the printer 70 does not send a response. As a result, as the PC 10 cannot receive the response, it is determined NO in S24.

Figure 4:
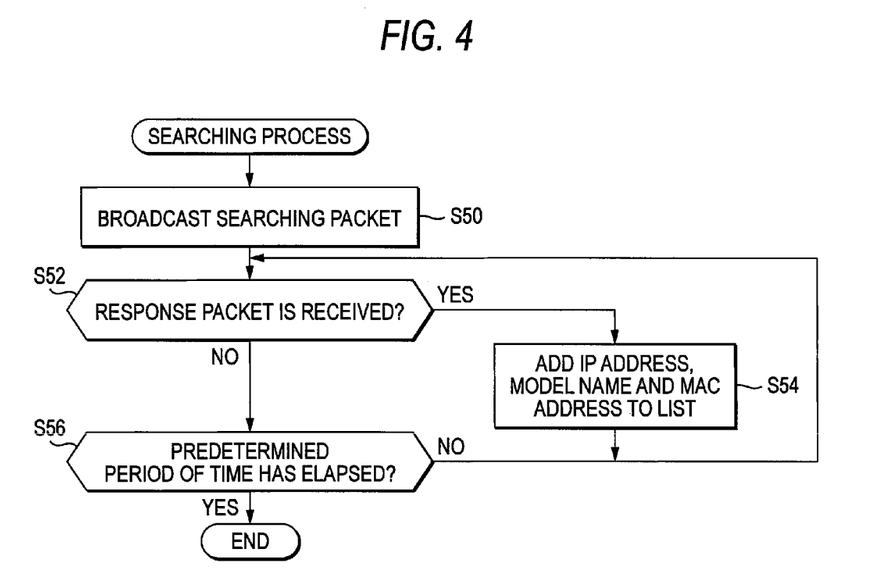
FIG. 4 shows a flowchart of a searching process.

In S26, the control unit 40 executes the searching process of FIG. 4. As shown in FIG. 4, a setting unit 50 (see FIG. 1) broadcasts a searching packet to the LAN 4 (S50). Different from the unicast communication, the searching packet of the broadcast communication in which the destination is unspecified is received by each device (such as printer 70) connected to the LAN 4. Each device that receives the searching packet unicastly sends a response packet, which contains a node name of the device itself, an IP address, a model name and a MAC address assigned currently to the device itself, to the PC 10. The setting unit 50 monitors the receiving of the response packet sent from each device (S52). If it is determined YES in S52, the setting unit 50 adds the IP address, the model name and the MAC address included in each response packet to a list not shown (S54). When S54 is terminated, the process returns to S52, and the setting unit 50 monitors the receiving of the response packet again. On the other hand, when S52 is NO, the process proceeds to S56.

For example, in the above first condition or the second condition, the network address of the PC 10 and the network address of the printer 70 are different. Thus, even if the printer 70 unicastly sends the response packet to the PC 10, the PC 10 cannot receive the response packet from the printer 70. In the first situation, the AP 64 which is the gateway of the printer 70 sends the response packet to the WAN. In the second situation, the broadband router 60 which is the gateway of the printer 70 sends the response packet to the WAN.

On the other hand, when the network address of the PC 10 is identical to the network address of the printer 70, the PC 10 can receive the response packet sent from the printer 70.

Figure 3:
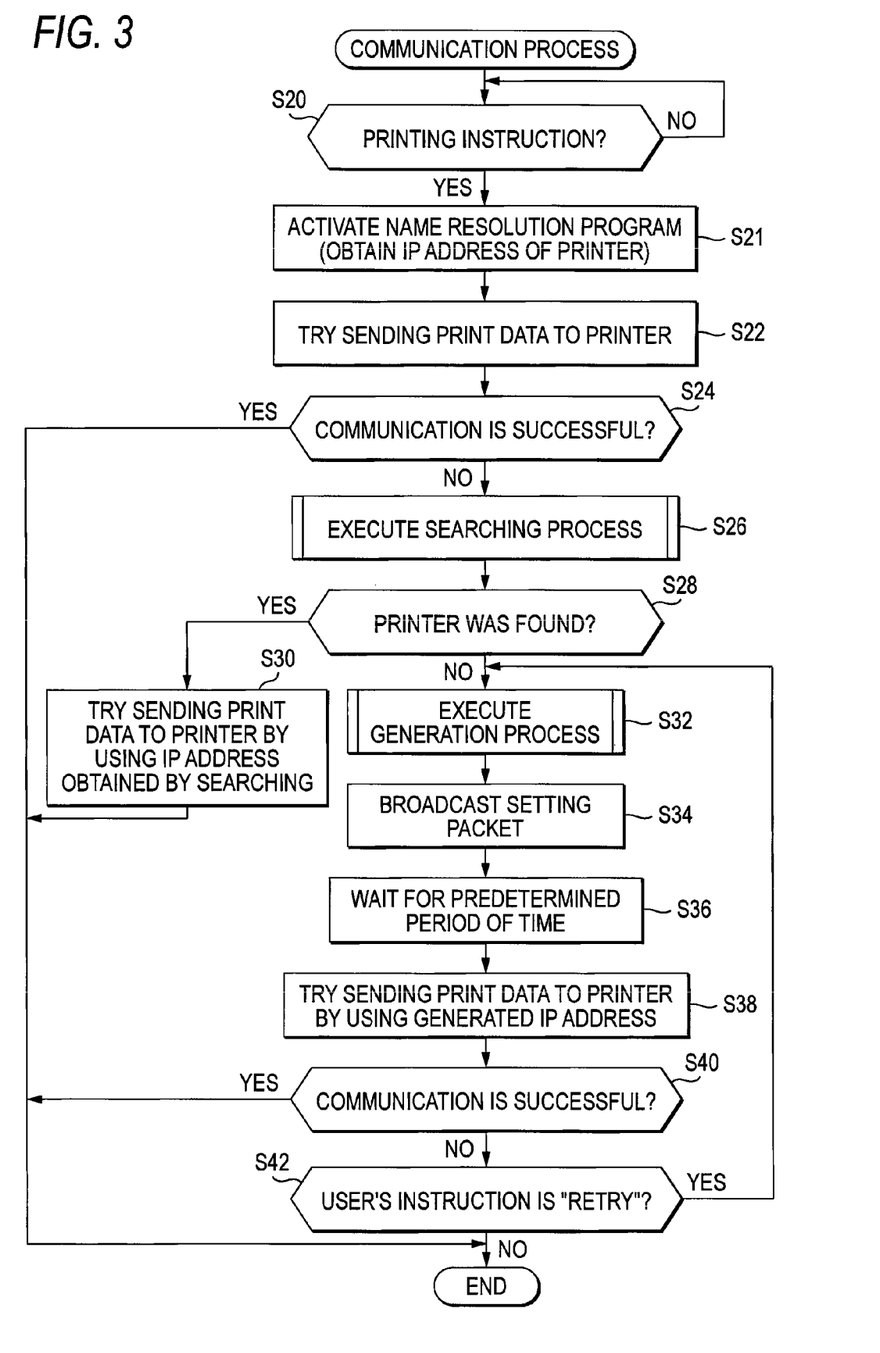
FIG. 3 shows a flowchart of a communication process.

Meanwhile, when it is determined NO in S24 of FIG. 3, and the response packet from the printer 70 is received in S52 of FIG. 4, the following situations can be considered. For example, when new IP addresses are assigned from the DHCP server (for example, the broadband router 60), the printer 70 executes a communication to register the new IP addresses in the DNS server 62. In this case, for example, when the power of the DNS server 62 is OFF, the new IP address of the printer 70 will not be registered in the DNS server 62. Instead, the old IP address of the printer 70 is maintained in the DNS server 62 (hereinafter called "the third situation"). In the third situation, in S21 of FIG. 3, the IP address of the printer 70 obtained from the DNS server 62 is the old IP address of the printer 70, not the current IP address of the printer 70. In this case, although it is determined NO in S24 of FIG. 3, the response packet from the printer 70 is received in S52 of FIG. 4.

In S56, the setting unit 50 determines whether a predetermined time have elapsed since the searching packet has been broadcasted in S50. If it is determined YES, the setting unit 50 terminates the searching process of FIG. 4, and the process proceeds to S28 of FIG. 3.

In S28, according to the searching process, the setting unit 50 determines whether the printer 70 has been found. Specifically, when the MAC address identical to the MAC address 38 of the printer 70 stored in the storage unit 30 is registered in the list generated in S54 of FIG. 4 (the third situation), the setting unit 50 determines YES in S28. In this case, the communication unit 46 tries to unicastly broadcast the print data to the printer 70 by using the current IP address of the printer 70 registered in the list as the destination (S30). In the communication of S30, the current IP address of the printer 70 is used. In addition, as the response packet from the printer 70 is received in S52 of FIG. 4, the network address of the printer 70 is identical to the network address of the PC 10. Thus, generally, the communication in S30 is successful. When S30 is terminated, the control unit 40 terminates the communication process.

Figure 5:
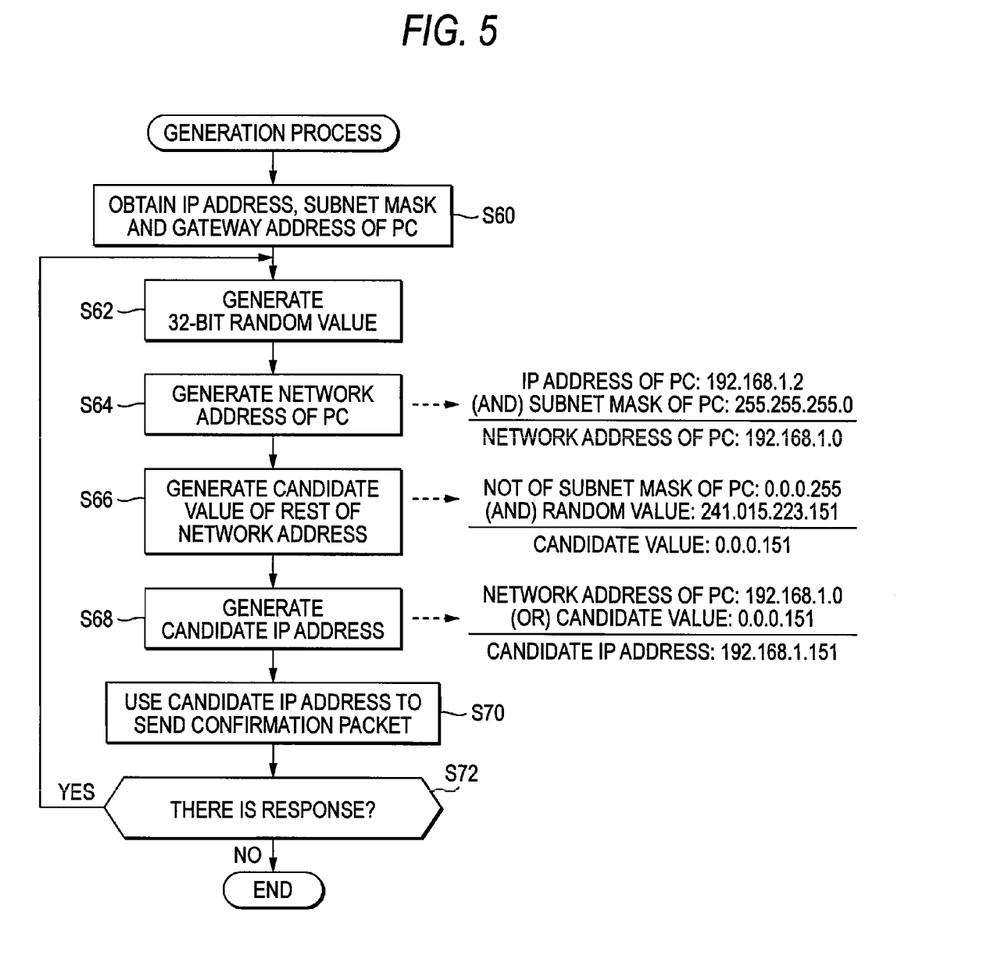
FIG. 5 shows a flowchart of a generation process.

On the other hand, when it is determined NO in S28, that is, in the above first situation or the second situation, the process proceeds to S32. In S32, the control unit 40 executes a generation process (see FIG. 5). As shown in FIG. 5, a generating unit 48 (see FIG. 1) obtains the IP address, the subnet mask (see 32 of FIG. 1) and the gateway address of the PC 10 stored in the storage unit 30 (S60).

Next, the generating unit 48 generates a 32-bit random value (S62). Next, the generating unit 48 uses the value of the IP address of the PC 10 and the value of the subnet mask of the PC 10 obtained in S60 to generate the network address of the PC 10 (S64). Specifically, the generating unit 48 generates a network address of the PC 10 by calculating logical multiplication (AND) of the IP address of the PC 10 and the subnet mask of the PC 10. In the example of FIG. 5, the value of the IP address of the PC 10 is [192. 168. 1. 2], and the value of the subnet mask of the PC 10 is [255. 255. 255. 0]. Thus, the above logical multiplication is [192. 168. 1. 0] in decimal digit. This value becomes the network address of the PC 10.

Next, the generating unit 48 generates a candidate value of the part of the IP address other than the network address (that is, the host part) (S66). In particular, first, the generating unit 48 calculates logical negation (NOT) of the subnet mask of the PC 10 obtained in S60. For example, the subnet mask of FIG. 5 is [255. 255. 255. 0], and shows that the first 24 bits are masked. Thus, the logical negation of the network mask of FIG. 5 is [0.0. 0. 255], and shows that only the last 8 bits are masked. Next, the generating unit 48 calculates the logical multiplication (AND) of the random value generated in S62 and the logical negation of the subnet mask of the PC 10. For example, in FIG. 5, the generated random value is [241. 015. 223. 151], and the logical negation of the subnet work of the PC 10 is [0.0. 0. 255]. Thus, the above logical multiplication is [0.0. 0. 151]. This value becomes the candidate value of the part of the IP address other than the network address.

Next, the generating unit 48 generates a candidate IP address (S68). In particular, the generating unit 48 calculates logical sum (OR) of the network address calculated in S64 and the candidate value calculated in S66. For example, in FIG. 5, the network address of the PC 10 is [192. 168. 1. 0], and the candidate value is [0.0. 0. 151]. Thus, the above logical sum is [192. 168. 1. 151] in decimal digit, and this value becomes the candidate IP address. Accordingly, the candidate IP address that contains a network address identical to the network address [192. 168. 1] of the PC 10 is generated.

Next, the generating unit 48 unicastly sends the confirmation packet to the generated candidate IP address (S70). The generating unit 48 monitors whether there is a response to the confirmation packet (S72). It is possible that, among the device groups connected to the LAN 4, there is a device to which an IP address identical to the candidate IP address generated in S68 is assigned. In this case, the device unicastly sends the response corresponding to the confirmation packet to the PC 10. When the response is received, that is, when there is such a device to which an IP address identical to the candidate IP address is assigned, the generating unit 48 determines YES in S72. Then the process returns to S62, and thus other new candidate IP addresses are generated. On the other hand, when the response is not received, that is, when there is no such a device to which an IP address identical to the candidate IP address is assigned, the generating unit 48 determines NO in S72, and the generation process is terminated. When the generation process is terminated (S32 of FIG. 3), the process proceeds to S34 of FIG. 3.

In S34, the setting unit 50 broadcasts a setting packet, which contains the candidate IP address calculated in S68 of FIG. 5, the MAC address of the printer 70 (38 in FIG. 1), the subnet mask currently set in the PC 10 (currently stored in the storage unit 30) and the gateway address currently set in the PC 10 (currently stored in the storage unit 30), to the LAN 4. Each device connected to the LAN 4 receives the setting packet that has been broadcasted. Thus, in either the first situation or the second situation, the printer 70 receives the setting packet. As a result, the printing process described later (see FIG. 6) is executed, and the IP address contained in the setting packet is set as a new IP address of the printer 70.

The communication unit 46 waits for a predetermined period of time (S36). Then, the communication unit 46 tries to unicastly send the print data to the printer 70 (S38) by setting the IP address (the IP address contained in the setting packet) generated in S68 of FIG. 5 is set as the destination. The setting unit 50 monitors whether the communication has succeeded (S40). The process of S40 is similar to the process of S24. As the setting packet is broadcasted in S34, the IP address contained in the setting packet is set in the printer 70. Furthermore, the network address of the IP address is identical to the network address of the PC 10. Thus, the printer 70 receives the print data sent in S38, and sends a response to the PC 10. In this case, it is determined YES in S40, and the communication process of FIG. 3 is terminated.

On the other hand, for example, when the power of the printer 70 is OFF, as the response from the printer 70 is not received, it is determined NO in S40. In this case, the control unit 40 determines whether a retry is instructed by a user by causing the display unit to display a screen which asks the user to select whether the processes of S32 to S40 need to be executed again (retry). When the retry is instructed by the user, the control unit 40 determines YES in S42, and the processes of S32 to S40 are executed again. On the other hand, when the retry is not instructed by the user, the control unit 40 determines NO in S42, and the communication process is terminated.

(Printing Process Executed by the Printer 70)

Figure 6:
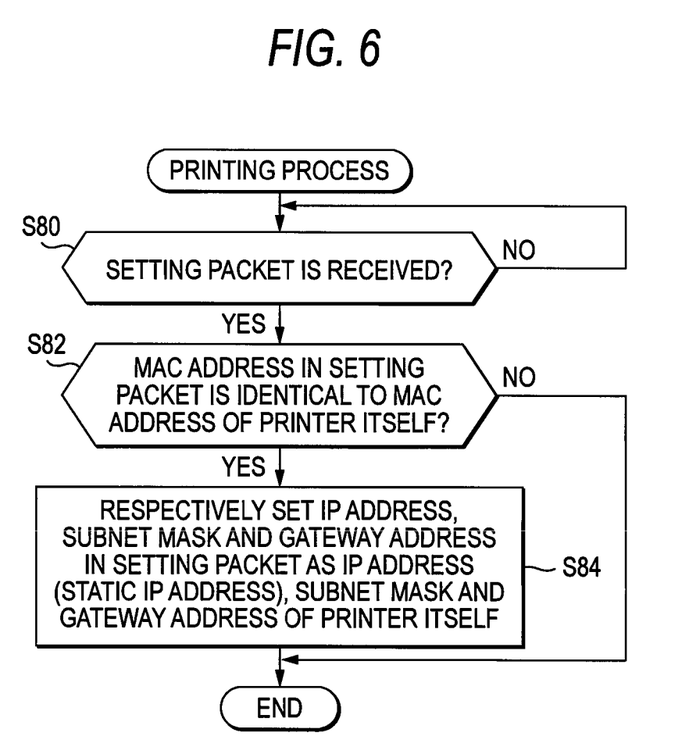
FIG. 6 shows a flowchart of a printing process.

Next, with reference to FIG. 6, the printing process, which is performed by the control unit 78 of the printer 70 according to the program 76, when the control unit 78 of the printer 70 receives the setting packet, is described. When the power of the printer 70 is ON, the control unit 78 monitors the receiving of the above setting packet (S80). When the setting packet is received, the control unit 78 determines YES in S80, and the process proceeds to S82. In S82, the control unit 78 determines whether the MAC address in the setting packet that has been received is identical to the MAC address of the printer 70. In the exemplary embodiment, as described above, as the MAC address of the printer 70 is contained in the setting packet, the control unit 78 of the printer 70 determines YES in S82 and the process proceeds to S84. On the other hand, when the device that receives the setting packet is an other device (not shown) different from the printer 70, as the MAC address of the printer 70 in the setting packet is not identical to the MAC address of the other device, the control unit of the other device determines NO in S82. When it is determined NO in S82, the process is terminated.

The printer 70 allows the user to select one setting method from multiple setting methods containing a first setting method, which sets a dynamic IP address automatically assigned by the DHCP server as the IP address of the printer 70, and a second setting method, which sets a static IP address as the IP address of the printer 70. When the first setting method is selected, the printer 70 requires the DHCP server to assign an IP address. On the other hand, when the second setting method is selected, the printer 70 does not require an IP address to be assigned by the DHCP server. In this case, the user can manually assign the IP address of the printer 70. The printer 70 sets the IP address assigned by the user as the static IP address of the printer 70. When the second setting method is selected, the printer 70 does not change the IP address, unless a new IP address is assigned by the user. In S84, the control unit 78 sets the IP address, the subnet mask and the gateway address in the setting packet as the new IP address, the new subnet mask and the new gateway address of the printer 70, respectively. Further, when the first setting method is selected, it is changed so that the second setting method is selected. Therefore, the IP address newly set to the printer 70 is not updated to an other IP address unless a new IP address is assigned by the user.

The configuration of the communication system 2 in the exemplary embodiment has been described in detail. When it is determined NO in S24 of FIG. 3, and NO in S28, that is, in the first situation or the second situation, the PC 10 of the exemplary embodiment broadcasts the setting packet. Because the designation is not specified in the broadcast communication, the printer 70 can receive the setting packet even in the first situation or the second situation. Therefore, a new IP address is set in the printer 70 (S84 of FIG. 6). As the network address of the new IP address set in the printer 70 is identical to the network address of the current IP address of the PC 10, the printer 70 and the PC 10 can execute the unicast communication via the same network. In the exemplary embodiment, the problem that the unicast communication between the PC 10 and the printer 70 cannot be executed can be solved.

Figure 2:
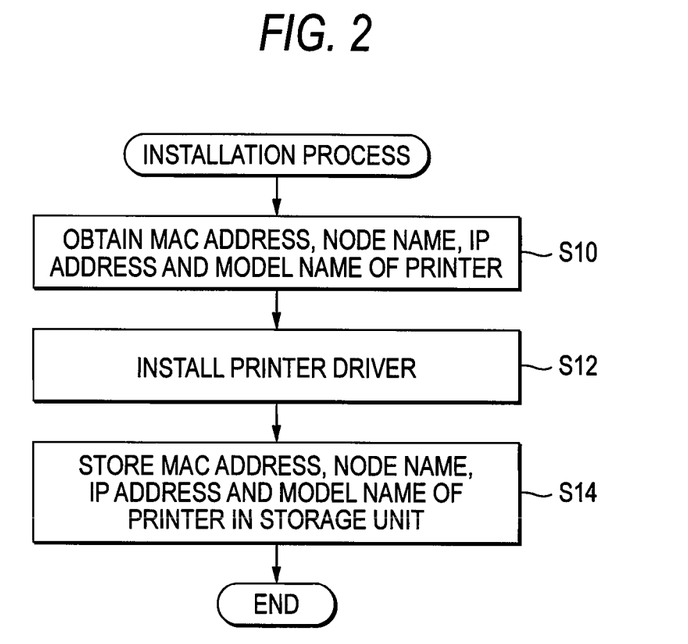
FIG. 2 shows a flowchart of an installation process.

The PC 10 of the exemplary embodiment obtains the MAC address from the printer 70 when the printer driver 24 is installed (S10 of FIG. 2). Thus, the PC 10 has definitely obtained the MAC address of the printer 70 when the unicast communication with the printer 70 is not successful (NO in S24 of FIG. 3). Therefore, the PC 10 can broadcast the setting packet containing a specific device identification information in the first situation or the second situation.

In addition, the PC 10 of the exemplary embodiment executes the generation process of FIG. 5 and generates a candidate IP address in the first situation or the second situation. Thus, the resource load (for example, memory load and IP address generation load) of the PC 10 can be reduced compared to the situation that the candidate address is generated and kept before it is confirmed that the printer 70 cannot be found.

In addition, when it is determined NO in S24 of FIG. 3, and YES in S28, that is, in the third situation, the PC 10 of the exemplary embodiment can obtain the current IP address of the printer 70 by searching (see FIG. 4), and can execute the unicast communication with a specific device by using the IP address.

In the exemplary embodiment, the setting packet contains the MAC address of the printer 70, the new IP address, the subnet mask currently set in the PC 10 and the gateway address currently set in the PC 10. The printer 70 newly sets the IP address contained in the setting packet as the static IP address of the printer 70 (S84). The new address set in the printer 70 is not changed, unless the user of the printer 70 instructs to change the IP address. Therefore, the situation that the unicast communication with the printer 70 fails again due to the change of the IP address of the printer 70 can be prevented.

In the exemplary embodiment, after the setting packet is broadcasted, the communication unit 46 of the PC 10 determines whether the new IP address is newly set to the printer 70 by communicating with the printer 70 by using the new IP address. Accordingly, even when the printer 70 can not send a notification packet, which notifies whether the setting has finished, to the PC 10, the PC 10 can determine whether the new IP address has been newly set to the printer 70.

The above-described exemplary embodiment can be modified as described below.

(1) In the above-described exemplary embodiment, although the IP address of IPv4 is used, an IP address of internet Protocol version 6 (IPv6) or an IP address of other versions can be used.

(2) The device identification information is not limited to the MAC address, but it can be combined information of the model names obtained in the installation process and serial numbers.

(3) In the above-described exemplary embodiment, when the printer driver 24 is installed, the device identification information obtaining unit 42 obtains the MAC address, the node name, the IP address, and the model name from the printer 70 by broadcasting the predetermined command to the LAN 4. However, the device identification information obtaining unit 42 can obtain the MAC address, the node name, the IP address, and the model name from the printer 70 when the printer driver 24 is installed by unicastly sending the predetermined command to the printer 70.

(4) In the above-described exemplary embodiment, as shown in S21 to S24 of FIG. 3, the PC 10 determines whether the communication has succeeded by actually trying to send the print data to the printer 70 after the PC 10 obtains the IP address of the printer 70 from the DNS server 62. However, the PC 10 may determine whether the network address of the obtained IP address of the printer 70 is identical to the network address of the IP address of the PC 10 itself, when the PC 10 obtains the IP address of the printer 70 from the DNS server 62. When it is determined that the network addresses are not identical, the PC 10 may determine that the communication will fail without sending the print data to the printer 70 (without executing S22 of FIG. 3), and then conduct the generation process (S32 of FIG. 3). That is, generally speaking, "when a communication with the device by using the current IP address fails" not only means the situation that a communication that has been actually tried fails, but also contains the expected situation that a communication will fail if the communication is tried.

(5) In addition, generally speaking, a "communication apparatus" is not limited to the PC 10, but can also be a peripheral machine of the PC 10 (for example, a printer, a scanner, a copier, a FAX or a telephone), a PDA, a mobile phone or a server.

The exemplary embodiments of the invention have been described above. However, the scope of claims may not be limited by the above-described exemplary embodiments. The technology described in the claim also includes variations and modifications of the above-described exemplary embodiments.

In addition, technical elements explained in the description and the drawings can be used independently or in combination so as to achieve technical utility, and is not restricted by the combination recited in the claims. In addition, a plurality of purposes can be achieved at the same time by the technology described in the description and the drawings, and by achieving one of the plurality of purposes, technical utility can be achieved.

What is claimed is:

1. A communication apparatus comprising:
a network interface configured to connect the communication apparatus with a network; a processor; and
memory storing a first IP address assigned to the communication apparatus and computer readable instructions, wherein the computer readable instructions cause, when executed by the processor, the communication apparatus and the processor to:
obtain first identification information of a particular device located in the network through the network interface and the network, the first identification information being unique to the particular device and in a particular format different from a format of IP addresses;
obtain a second IP address assigned to the particular device through the network interface and the network;
set the second IP address for use in communication with the particular device;
attempt a unicast communication with the particular device by using the second IP address as a destination;
determine whether the unicast communication with the particular device failed;
generate a new IP address when it is determined that the unicast communication with the particular device has failed, the new IP address containing a network address identical to a network address contained in the first IP address stored in the memory; and
broadcast a setting packet to the network, the setting packet comprising the first identification information, the new IP address and particular instructions, wherein the particular instructions causes a recipient device of the setting packet to:
determine whether second identification information is identical to the first identification information in the setting packet, the second identification information being unique to the recipient device and in the particular format; and
determine whether a DHCP server located in the network assigns a third IP address to the recipient device, and
when it is determined that the second identification information is identical to the first identification information and it is determined that the DHCP server assigns the third IP address to the recipient device, assign the new IP address as a static IP address to the recipient device, instead of the third IP address assigned by the DHCP server.

2. The communication apparatus according to claim 1, wherein the computer readable instructions further cause the communication apparatus and the processor to:
obtain the first identification information of the particular device when a device driver of the particular device is installed in the communication apparatus, and
broadcast the setting packet to the network when the communication apparatus and the processor fail to send a command to the device.

3. The communication apparatus according to claim 1, wherein the computer readable instructions further cause the communication apparatus and the processor to:
broadcast a searching packet to the network when it is determined that the unicast communication with the particular device has failed, the searching packet being configured to request a response packet from a recipient device, and the response packet including identification information and an IP address of the recipient device;
receive the response packet from the recipient device;
determine whether the identification information in the response packet is identical to the first identification information; and
broadcast the setting packet to the network when it is determined that the identification information in the response packet is not identical to the first identification information.

4. The communication apparatus according to claim 3, wherein the computer readable instructions further cause the communication apparatus and the processor to:
generate the new IP address, and then broadcast the setting packet to the network when it is determined that the identification information in the response packet is not identical to the first identification information.

5. The communication apparatus according to claim 3, wherein the computer readable instructions further cause the communication apparatus and the processor to:
Set the IP address included in the response packet for use in communication with the particular device when it is determined that the identification information in the response packet is identical to the first identification information.

6. The communication apparatus according to claim 1, wherein the computer readable instructions further cause the communication apparatus and the processor to:
attempt a unicast communication with the particular device by using the new IP address after broadcasting the setting packet.

7. A non-transitory computer readable storage medium storing computer readable instructions that, when executed by a processor in a communication apparatus, cause the communication apparatus to:
obtain first identification information of a particular device located in the network via the network, the first identification information being different from an IP address and unique to the particular device;
obtain a particular IP address assigned to the particular device via the network;
set the particular IP address for communication with the particular device;
attempt a unicast communication with the particular device by using the particular IP address as a destination;
determine whether the unicast communication with the particular device failed;

generate a new IP address when it is determined that the unicast communication with the particular device failed, wherein the new IP address contains a network address identical to a network address contained in an IP address assigned to the communication apparatus; and broadcast a setting packet to the network, the setting packet comprising the first identification information, the new IP address and particular instructions wherein the particular instructions cause a recipient device of the setting packet to:

determine whether second identification information is identical to the first identification information in the setting packet, the second identification information being different from an IP address and unique to the recipient device;

determine whether a DHCP server located in the network assigns the IP address to the recipient device; and when it is determined that the second identification information is identical to the first identification information and it is determined that the DHCP server assigns the IP address to the recipient device, assign the new IP address as a static IP address to the recipient device, instead of the IP address assigned by the DHCP server.

8. A system comprising:

a communication apparatus comprising:

a network interface configured to connect the communication apparatus with a network;

a processor; and memory storing a first IP address assigned to the communication apparatus and computer readable instructions; and a particular device located in the network, wherein, when executed by the processor, the computer readable instructions cause the communication apparatus and the processor to:

obtain first identification information of a particular device located in the network through the network interface and the network, the first identification information being unique to the particular device and in a particular format different from a format for IP addresses;

obtain a second IP address assigned to the particular device through the network interface and the network;

set the second IP address for use in communication with the particular device;

attempt a unicast communication with the particular device by using the second IP address;

determine whether the unicast communication with the particular device failed;

generate a new IP address when it is determined that the unicast communication with the particular device failed, the new IP address containing a network address identical to a network address contained in the first IP address stored in the memory; and broadcast a setting packet to the network in response to generating the new IP address, the setting packet comprising the first identification information, the new IP address and particular instructions, wherein the particular instructions cause a recipient device of the setting packet to:

determine whether second identification information is identical to the first identification information in the setting packet, the second identification information being unique to the recipient device and in a particular format different from a format of IP address and;

determine whether a DHCP server located in the network assigns a third IP address to the recipient device; and when it is determined that the second identification information is identical to the first identification information and it is determined that the DHCP server assigns the third IP address to the recipient device, assign the new IP address as a static IP address to the recipient device, wherein the particular device is configured to:

receive the broadcasted setting packet;

determine that the first identification information in the setting packet is identical to the first identification information of the particular device;

determine whether the DHCP server located in the network assigns the third IP address to the particular device; and when it is determined that the DHCP server assigns the third IP address to the particular device, assign the new IP address as a static IP address to the particular device, instead of the third IP address assigned by the DHCP server.

* * * * *